United States Patent
Rudolf et al.

(10) Patent No.: US 7,218,622 B2
(45) Date of Patent: May 15, 2007

(54) METHOD OF TRANSMITTING A SYNCHRONISATION SIGNAL DURING A SYNCHRONISATION TIME SLOT OF A MOBILE RADIO TELECOMMUNICATION SYSTEM OF THE TIME DIVISION DUPLEX (TDD) TYPE

(75) Inventors: Marian Rudolf, Rennes (FR); Bruno Jechoux, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1112 days.

(21) Appl. No.: 09/962,235

(22) Filed: Sep. 26, 2001

(65) Prior Publication Data

US 2002/0041573 A1     Apr. 11, 2002

(30) Foreign Application Priority Data

Oct. 2, 2000   (FR)   .................................. 00 12762

(51) Int. Cl.
*H04B 7/216*    (2006.01)
*H04J 3/06*     (2006.01)

(52) U.S. Cl. ...................... 370/335; 370/342; 370/350; 370/512

(58) Field of Classification Search ................ 370/335, 370/342, 350, 509, 512; 380/34, 48
See application file for complete search history.

(56) References Cited

U.S. PATENT DOCUMENTS

| 5,666,366 A | 9/1997 | Malek et al. |
| 5,930,366 A * | 7/1999 | Jamal et al. ................. 370/509 |
| 6,005,854 A | 12/1999 | Xu et al. |
| 6,834,046 B1 * | 12/2004 | Hosur et al. ................. 370/335 |

FOREIGN PATENT DOCUMENTS

| DE | 199 16 063 | 7/2000 |
| WO | WO 00/57581 | 9/2000 |

* cited by examiner

*Primary Examiner*—Chi Pham
*Assistant Examiner*—Melanie Jagannathan
(74) *Attorney, Agent, or Firm*—Oblon, Spivak, McClelland, Maier & Neustadt, P.C.

(57) ABSTRACT

A method of transmitting a synchronisation signal during a synchronisation time slot of a system for time division-duplex (TDD) telecommunication by mobile stations where the data is transmitted in frames consisting of time slots. The method includes transmitting the synchronisation sequence with a delay with respect to the start of a synchronisation time slot.

7 Claims, 1 Drawing Sheet

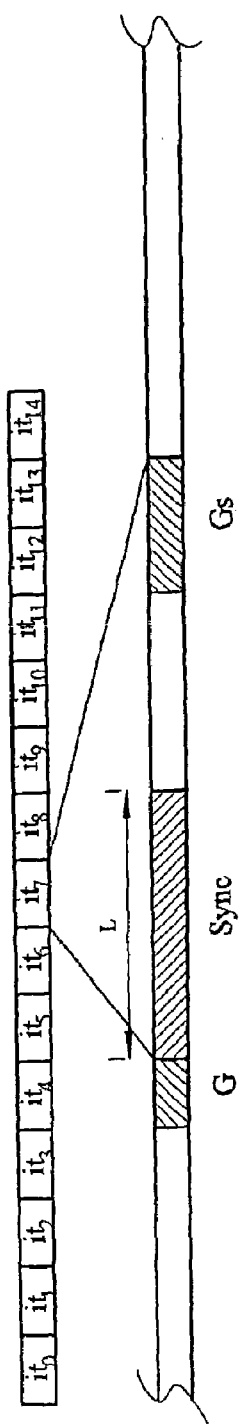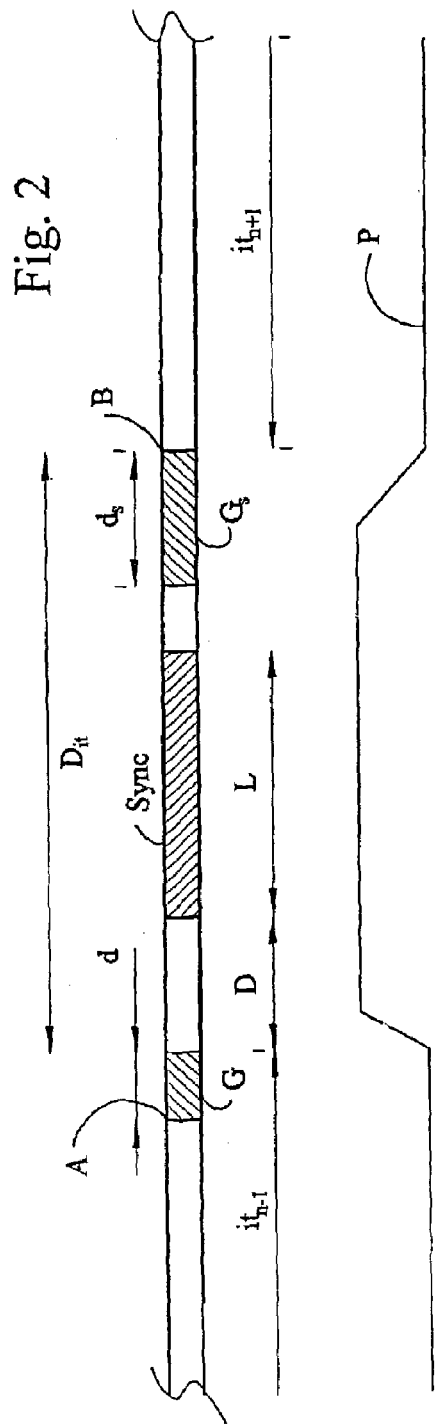

180
METHOD OF TRANSMITTING A SYNCHRONISATION SIGNAL DURING A SYNCHRONISATION TIME SLOT OF A MOBILE RADIO TELECOMMUNICATION SYSTEM OF THE TIME DIVISION DUPLEX (TDD) TYPE

BACKGROUND OF THE INVENTION

1. Field of the Invention

The present invention concerns a method of transmitting a synchronisation signal during a synchronisation time slot of a mobile radio telecommunication system of the time division duplex (TDD) type. Such a signal is used for example for ensuring synchronisation of the base stations in a mobile radio telecommunication system of the time division duplex (TDD) type. The said telecommunication system is for example the system for which the standard normally referred to as 3GPP W-CDMA TDD is currently being prepared.

2. Discussion of the Background

FIG. 1 depicts a radio frame of such a telecommunication system of the time division duplex type. It consists of fifteen time slots, some of which, for example the slots $it_0$, $it_1$, $it_2$, $it_5$, $it_6$ and $it_8$, are intended for conveying data (in the broad sense of the term) in the downlink direction (base station to mobile station) whilst others, for example the slots $it_3$, $it_4$, $it_7$, $it_9$, $it_{10}$, $it_{11}$, $it_{12}$, $it_{13}$, $it_{14}$ and $it_{15}$, are intended for conveying data in the uplink direction (mobile station to base station). In this system, several mobile or base stations can transmit or receive data in or from the same time slot. They are differentiated by code division multiplexing (Code Division Multiple Access=CDMA).

Each time slot is provided with a guard period so that the reception of the signal which has been transmitted by a mobile station is not interfered with by time drifts or delays due to the greater or lesser distance of this mobile station with respect to the receiving base station. A guard period thus ensures that the signal received from a mobile station is always in the time slot allocated to it.

The present invention concerns a method of transmitting a synchronisation signal during a synchronisation time slot of a system for time division duplex (TDD) telecommunication by mobile stations where the data is transmitted in frames consisting of time slots, and the synchronisation signal includes a synchronisation sequence.

This method includes transmitting the synchronisation sequence Sync with a delay D with respect to the start of a synchronisation time slot.

Because the same frequency is used both in the uplink direction and in the downlink direction, it is necessary that synchronisation of the base stations be ensured. This is done so that the time slots transmitted by a base station are transmitted at the same time as those from any other base station. The time slots of all the base stations are therefore transmitted at the same time.

This is because, if such is not the case, a mobile station transmitting at high power in the uplink channel could make it impossible for another mobile station close to the first mobile station to receive data from the downlink channel.

In the embodiment which concerns the present invention, this synchronisation between base stations is effected by reserving certain time slots for the transmission and reception of a synchronisation sequence Sync. The synchronisation of a base station is then obtained, in a manner known per se, by the correlation of the received sequence with a sequence which is a replica of the one transmitted. Thus, when a base station receives this synchronisation from at least one of the adjacent base stations, it can adjust its sequencing to that of the other base stations.

The synchronisation sequence generally used is lengthy (several thousands of chips) in order to have better gain in the correlation processing.

A guard period Gs is provided in the time slot allocated to the synchronisation so that the synchronisation process is not interfered with by drifts of the respective clocks of the base stations but also frame times, time slots or chips.

The synchronisation sequence Sync generally used is chosen so as to have a good autocorrelation function. Thus, generally, it has a length L which is an $N^{th}$ power of 2, N being an integer number N, so that $L=2^N$, or an $N^{th}$ power of 2 minus 1, that is to say $L=2^N-1$. The latter case is the one for example of the Gold sequences or M sequences generally used for the purpose of synchronisation. In the latter case, the lengths L can for example be 15, 31, . . . , 1023, 2047, etc.

However, the maximum length available for a synchronisation sequence corresponds to that of a time slot minus the duration of the guard period of the time slot allocated to this synchronisation sequence. It will be understood that it is always possible to choose a synchronisation sequence whose length is less than this available length.

For example, in the case of the W-CDMA TDD system, the available length is 2560−160=2400 chips. It will then be possible to choose as the length of sequences: $L=2^{11}-1=2047$ chips, that is to say N=11.

In general, the time slot allocated to the synchronisation comprises a synchronisation sequence Sync placed at the start of the time slot followed by a period of time without transmission itself followed by a guard period Gs.

However, it proves that this configuration poses a problem because of interference generated with the previous and following time slots during the correlation process implemented on reception of the synchronisation time slot.

The purpose of the present invention is to propose a method of transmitting a synchronisation signal of the type mentioned above which makes it possible to eliminate or at least attenuate the interference with the previous and following time slots generated during the correlation process.

To this end, a method of transmitting a synchronisation signal during a synchronisation time slot in a system for telecommunication by mobile stations of the time division duplex (TDD) type where the data are transmitted in frames consisting of time slots, the said synchronisation signal including a synchronisation sequence is characterised in that it consists of transmitting the synchronisation sequence Sync with a delay D with respect to the start of the said synchronisation time slot.

According to another characteristic of the invention, the said delay D is greater than the time necessary for the transmission power to pass from the minimum power to the maximum power.

According to another characteristic of the invention, the said delay D is such that the said synchronisation sequence is centred in the time slot included between the end of transmission of the data in the time slot preceding the synchronisation time slot and the start of transmission of the data in the time slot following the said synchronisation time slot.

According to another characteristic of the invention, when the said transmission method according to one of the preceding claims is implemented in a transmission system for which each time slot has a duration $D_{it}$, for which a guard period of each time slot it has a duration d, the length of the said synchronisation sequence being L, the said delay D is given by the following equation:

$$D = \frac{D_{it} - d - L}{2}$$

More precisely, when the said method is implemented in a transmission system of the W-CDMA TDD type for which each time slot has a duration of 2560 chips, for which a guard period of each time slot has a duration of 96 chips, characterised in that the length of the said synchronisation sequence is 2047 or 2048 chips and in that the said delay D is 208 chips.

BRIEF DESCRIPTION OF THE DRAWINGS

The characteristics of the invention mentioned above, as well as others, will emerge more clearly from a reading of the following description of an example embodiment, the said description being given in relation to the accompanying drawings, amongst which:

FIG. 1 is a view of a transmission frame of a transmission system of the W-CDMA TDD type, and FIG. 2 is a view of part of such a frame, incorporating a synchronisation time slot.

DESCRIPTION OF THE PREFERRED EMBODIMENTS

In FIG. 2, three time slots $it_{n-1}$, $it_n$, and $it_{n+1}$ can be seen, the middle one $it_n$ of which is dedicated to synchronisation. For this purpose, it supports a synchronisation sequence Sync and includes a guard period. The length of the synchronisation sequence L is less than the length $D_{it}$ of a time interval minus the duration $d_s$ of the guard period.

If, by way of example, the case of the W-CDMA TDD system is taken, the length of a time slot is generally 2560 chips. As already mentioned in the preamble to the present description, the length L of the synchronisation sequence is equal either to the $N^{th}$ power of 2 or to the $N^{th}$ power of 2 from which 1 is deducted.

The guard periods G, $G_s$ of the time slot $it_{n-1}$ and of the time slot $it_n$ are depicted. In the case of the W-CDMA TDD system, the guard period G of a time slot transporting data is 96 chips. The guard period Gs is on the other hand a little longer with regard to the time slot allocated to synchronisation. It is then in fact 160 chips.

As can be seen in FIG. 2, according to the method of the present invention, the synchronisation sequence Sync is transmitted with a delay D with respect to the start of the synchronisation time slot $it_n$.

Thus, when this synchronisation signal is received, a sliding correlation of this signal is effected with a local replica of the synchronisation sequence, and the main peak resulting from this correlation is sought in a zone framing the hoped-for position of the said synchronisation sequence Sync. However, by delaying the transmission of the synchronisation sequence with respect to the start of the synchronisation time slot, the overlap of the part which is the subject of the correlation process coming from the previous time slot $it_{n-1}$ is limited.

According to another characteristic of the present invention, the delay D is such that the synchronisation sequence Sync is centred in the time period between the end of transmission of the data of the time slot $it_{n-1}$ (point A in FIG. 2) preceding the synchronisation time slot $it_n$ and the start of transmission of the data of the time slot $it_{n+1}$ (point B) following the said synchronisation time slot $it_n$. Thus it is possible to write:

$$D = \frac{D_{it} - d - L}{2}$$

In the case of a transmission system of the W-CDMA TDD type for which each time slot has a duration of 2560 chips, for which the guard period G of each time slot has a duration of 96 chips and the guard period Gs of each synchronisation time slot is 196 chips, the delay D is then 208 chips for a synchronisation length L of 2047 chips or 2048 chips.

Generally, notably in order to be able to receive by means of other base stations necessarily external to the cell covered by the base station in question, the synchronisation sequence Sync is transmitted with a power greater than that of the data intended for mobile stations. This transmission power of the synchronisation sequence Sync is generally the maximum power which a base station can offer.

This is because the power of transmission of the synchronisation sequence by a base station is necessarily higher than that of the data to the mobiles since it must make it possible to reach other base stations external to the cell covered by the base station in question. Moreover, this transmission power is at a maximum in so far as the synchronisation sequence alone is transmitted at this moment.

However, the transmission power of a base station (like a mobile station) does not instantaneously change from one value, which may be minimum, to a value which is maximum and vice-versa. For example, for a base station, the duration of the rise in power is approximately 16 chips whilst it is 76 chips for the drop.

Because of this, to enable the synchronisation sequence Sync to be entirely transmitted at maximum power, according to another characteristic of the present invention, the delay D is at least greater than the time necessary for the transmission power to change from minimum power to maximum power.

FIG. 2 depicts, above a synchronisation time slot $it_n$, the transmission power P of the base station in question and it can be seen that the synchronisation sequence Sync is transmitted at maximum power.

The invention claimed is:

1. A method of transmitting a synchronisation sequence during a synchronisation time slot of a telecommunication system by a time division duplex (TDD) mobile system where data is transmitted in frames consisting of time slots, said method comprising:
    transmitting the synchronisation sequence with a delay with respect to a start of said synchronisation time slot;
    wherein the delay is selected such that the synchronisation sequence is located on the time slot included between an end of transmission of data of the time slot preceding the synchronisation time slot and the time of transmission of a data in the time slot following the synchronisation time slot.

2. Transmission method according to claim 1, wherein the method further comprises:
    selecting the delay to be greater than a time necessary for a transmission power to change from minimum power to maximum power.

3. A method of transmitting a synchronisation sequence transmission method according to claim 2, wherein the selecting further comprises:

selecting said delay D according to the following equation:

$$D = \frac{D_{it} - d - L}{2}.$$

wherein $D_{it}$ is a duration of each time slot it, d is a duration of a guard period in each time slot it, and L is a duration of the synchronisation sequence.

4. Transmission method according to claim 2, wherein the TDD system includes a W-CDMA TDD system for which each time slot has a duration of 2560 chips, a duration of a guard period of each time slot is 96 chips, and a duration of the synchronisation sequence is 2047 or 2048 chips, wherein said selecting further comprises:

selecting said delay to be 208 chips.

5. A method of transmitting a synchronisation sequence during a synchronisation time slot of a telecommunication system by a time division duplex (TDD) mobile system where data is transmitted in frames consisting of time slots, said method comprising:

transmitting the synchronisation sequence with a delay with respect to a start of said synchronisation time slot in the uplink, wherein the delay is selected such that the synchronisation sequence is located in the time slot included between an end of transmission of data of the time slot preceding the synchronisation time slot and the time of transmission of data in the time slot following the synchronisation time slot.

6. The method according to claim 1, wherein each synchronisation time slot has a guard period which is located between the synchronisation sequence and the start of transmission of the data of the time slot following the synchronisation time slot.

7. The method according to claim 5, wherein each synchronisation time slot has a guard period which is located between the synchronisation sequence and the start of transmission of the data of the time slot following the synchronisation time slot.

* * * * *